Aug. 1, 1950  J. A. GAYLORD  2,517,298
FISH LURE
Filed April 16, 1946  2 Sheets-Sheet 1
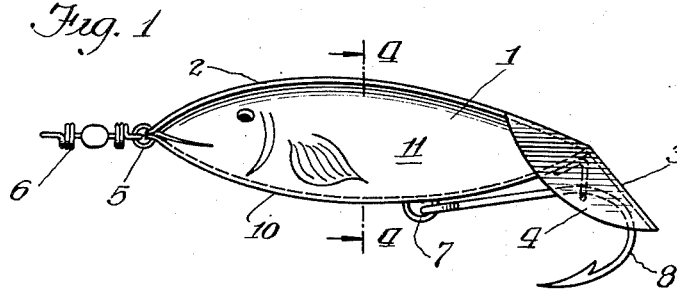
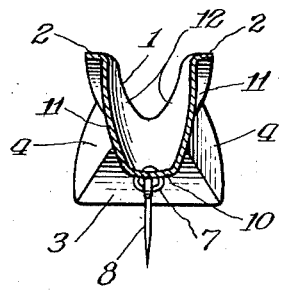
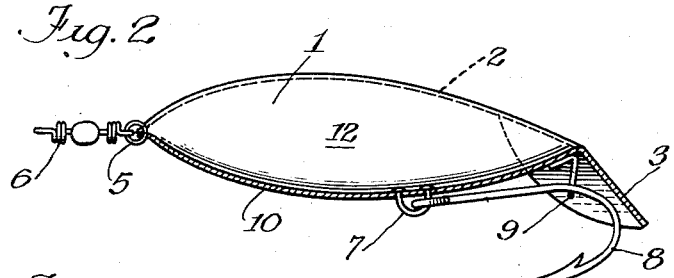
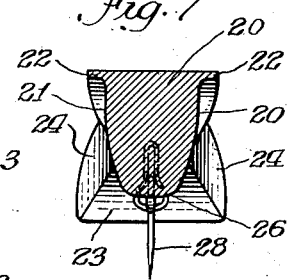
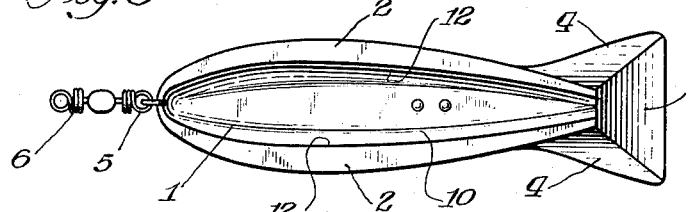
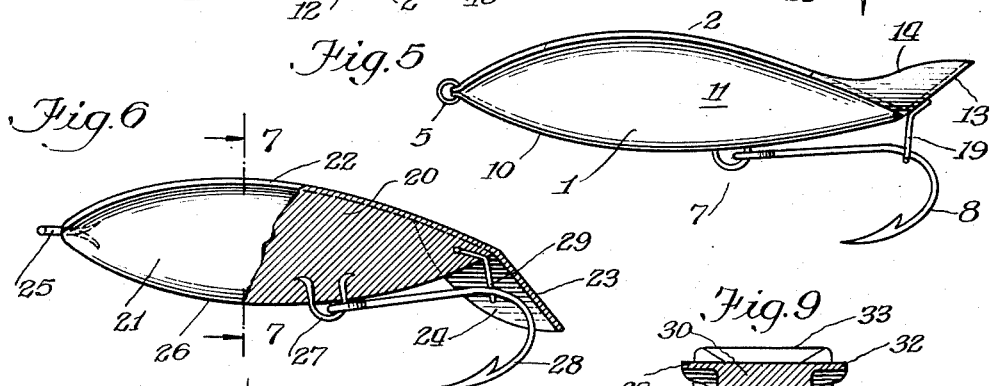
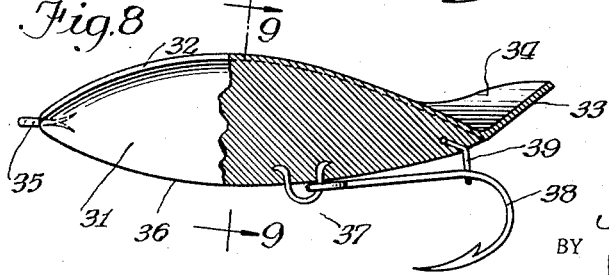
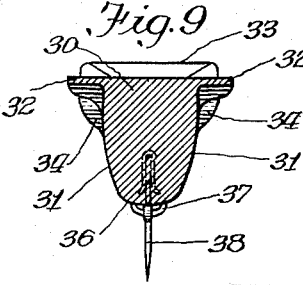
INVENTOR.
Jay A. Gaylord
BY
ATTORNEY.

Aug. 1, 1950 J. A. GAYLORD 2,517,298
FISH LURE
Filed April 16, 1946 2 Sheets-Sheet 2
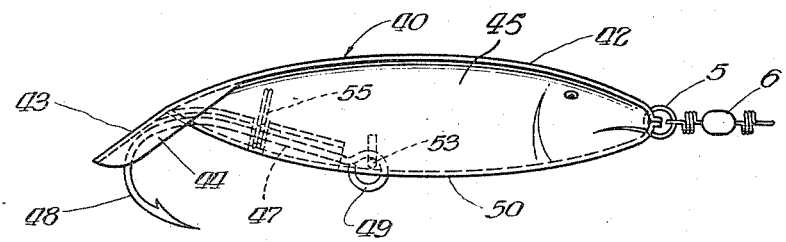
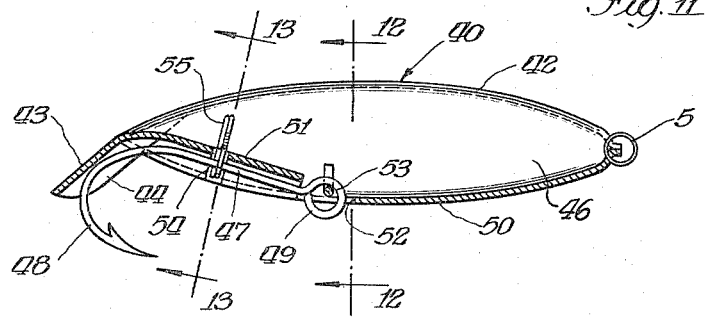
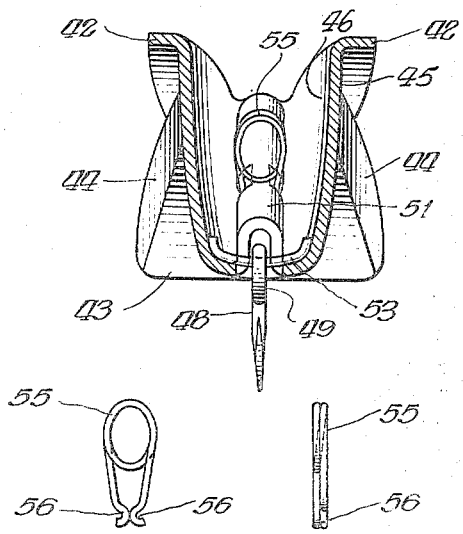
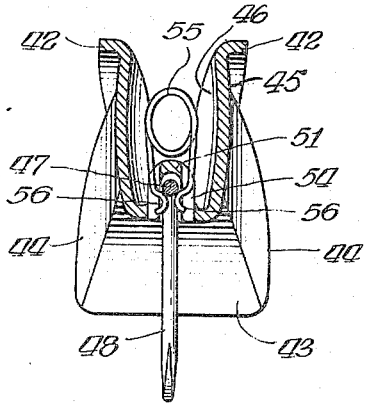
INVENTOR.
Jay A. Gaylord
BY Burton & Burton
ATTORNEY.

Patented Aug. 1, 1950

2,517,298

UNITED STATES PATENT OFFICE 2,517,298

FISH LURE

Jay A. Gaylord, Seattle, Wash.

Application April 16, 1946, Serial No. 662,637

4 Claims. (Cl. 43—42.47)

This invention relates to baitless fishing lures, and, more specifically, to the swimming type of lure.

One object of the invention is to provide a lure which has the appearance and movements of a fish as viewed from any angle presented to a live fish in the water.

Another object of the invention is to provide a lure which can be pressed or stamped from one piece of metal, or molded of plastic material.

Still another object of the invention is to provide a lure which can be colored in brass, copper, gold, or silver, or in any coloring preferred by the fishermen, or which can be enameled after forming.

A further object of the invention is to provide a lure for casting, trolling, or other forms of fishing, and which is adapted for use without the special skill required in placing live bait on the hook.

A further object of the invention is to provide a lure in which the hook is partially concealed when the device is placed in service, said hook being released from its concealed position when the fish bites.

More specifically, it is an object of the invention to provide a relatively rigid lure which can be made of wood, metal, or plastic material, and which includes laterally extending flanges or fins along the upper arched outline, lower downwardly convex longitudinally curved bottom wall, and large side wall surfaces, together with a specially arranged tail surface, all of which cooperate to give the lure very erratic, rocking, rising, diving and wig-wagging motions.

It is also an object of the invention to provide a lure with large side wall surfaces arranged to prevent the lure from rotating around its longitudinal axis.

An additional object of the invention is to provide a lure having a slot or recess, together with a communicating groove in the lower rear surface of the lure for receiving the eye and shank of a hook.

A still further and specific object of the invention is to provide a clip inserted through slots in both sides of the said groove, for loosely holding the shank of the hook therein at inoperative position.

The objects of the invention also comprise the provision of a lure which can be adapted for fast or slow trolling by forming the tail at a greater or less oblique angle to the longitudinal axis of said lure.

A further object of the invention also comprises the provision of dive flanges, extending from both sides of the lure body and tending along the upper outline which tend to cause the lure to dive and also act as anti-rolling flanges which dampen any quick movement of the lure to revolve around its longitudinal axis.

A still further object of the invention comprises the provision of forming the tail at an inclination to the longitudinal axis, the angle of which determines the speed at which the lure can be trolled and also determines the angle to which the lure displaces in relation to line of troll.

Further objects may be revealed as the description proceeds.

In the drawings:

Fig. 1 is a side elevation of a fishing lure embodying this invention, having a hollow body and with a hook associated therewith and a coupling member attached thereto for connection to a line.

Fig. 2 is a vertical longitudinal section of the same.

Fig. 3 is a top plan view of the lure shown in Fig. 1.

Fig. 4 is a transverse vertical section taken as indicated at line 4—4 on Fig. 1.

Fig. 5 is a side elevation of a modified form of lure having the tail surface differently arranged.

Fig. 6 is a side elevation, partly in longitudinal section, showing a modification in which the body portion is solid.

Fig. 7 is a transverse vertical section taken as indicated at line 7—7 on Fig. 6.

Fig. 8 is a side elevation, partly in section, showing another modification having a solid body but with the tail portion arranged differently than in Fig. 6.

Fig. 9 is a transverse vertical section taken as indicated at line 9—9 on Fig. 8.

Fig. 10 is a side elevation of a modified form of lure embodying the invention and in which a channel is formed in the body of the lure to accommodate a portion of the hook.

Fig. 11 is a longitudinal vertical sectional view of the lure shown in Fig. 10.

Fig. 12 is a transverse vertical section taken as indicated at the line 12—12 on Fig. 11, and on a larger scale.

Fig. 13 is a transverse section taken as indicated at the line 13—13 on Fig. 11, and on the same scale as Fig. 12.

Fig. 14 is a front elevation of the spring clip for retaining the hook at inoperative position.

Fig. 15 is a side elevation of the clip.

The fishing lure as shown in Figs. 1 to 4 includes a hollow body 1 which may be made of metal or molded plastic material and which, as shown in Fig. 4, is upwardly open or approximately U-shaped in cross-section. Viewed from the side, the device approximates the outlines of a small fish, but its upper longitudinal edges, which are curved from end to end, are provided with laterally extending dive fins or flanges 2, 2. A tail portion 3 extends obliquely downward at one end of the body 1 and is braced to the dive flanges 2, 2, by bracing flanges 4, 4 which join the flaring edges of the tail surface 3 with the rear portions of said dive flanges 2, 2.

A ring 5 is secured in the nose of the lure for attachment to a coupling member 6, by which the lure is connected to a line. A staple 7 is secured in the under side of the body 1 so that the eye of a hook 8 may be permanently attached thereto; and when the lure is first placed in the water the hook is held up close to the body 1 and partially concealed under the tail portion 3 and bracing flanges 4 by means of a bifurcated spring clip 9 depending from the bottom of the body 1 adjacent the tail portion.

While the dive fins or flanges 2, 2 are upwardly arched or convex, the bottom wall 10 is oppositely curved or downwardly convex in longitudinal outline. The flanges 2, 2 therefore have a tendency to cause the lure to dive as it is drawn through the water, whereas the oppositely curved wall 10 operates to steer the lure upwardly in the water, causing it to rise. In actual practice, starting with the lure in about the position shown in Fig. 1, as it is trolled, it starts to rise, and the lure starts to turn in response to the pressure of water directed against said tail, causing said lure to become unbalanced and turn on its side due to the forward travel. This diverts the stream of water to one side of the lure, causing the lure to shift around so that the body of the lure is at an angle to the true line of troll; in fact, it acts much like a boat being towed with the rudder hard over. But as this angular relation to the direction of travel increases, the rising ability of the lure is reduced, and at the same time the angular position of the lure relieves the pressure on the tail. The upwardly convex longitudinally curved dive flanges 2, 2 then come into action, causing the lure to dive in a curved angular course, approaching alignment with the direction of troll. As it reaches its initial position the current again strikes the tail, and due to the momentum of the previous turn, it turns to the opposite side as the lure again begins to rise, and the whole operation is repeated, but at the opposite side as compared with the previous action. Thus, as it travels through the water, the lure alternately dives and rises, while turning from side to side. The pressure against tail surface 3 directed by the bracing flanges 4, 4 of the tail is never quite the same at both sides; consequently, there is always a tendency for the lure to turn one way or the other, and its resulting motion resembles that of a wounded minnow.

The outer side wall surfaces 11, 11 and the inner side wall surfaces 12, 12, have a rotation resisting effect which prevents the lure from completely rotating around its longitudinal axis, while permitting the limited turning action from side to side which contributes to its realistic behavior in the water.

Preferably, the external surface of the lure will be finished in brass, gold, copper, silver, or with colored enamels, so that its uneven movement in the water will send flashes of reflected light in all directions, tending to attract fish. Preferably, the eyes, outlines of gills, and other characteristic markings will be included in the surface decoration so that the lure will closely resemble fresh bait.

When a fish bites, and is caught by the sharp end of the hook 8, the direction of strain will be such as to release the hook automatically from the clip 9, permitting it to more effectively engage the fish which has been caught. The lure itself, being of rigid and substantial construction, will not be injured by the struggles of the fish, and can be used repeatedly.

Fig. 5 shows a slight modification of the structure already described. The body 1 and dive fins or flanges 2 are the same as shown in Fig. 1, the ornamentation having been omitted in Fig. 5; but the tail 13 extends obliquely upward from the end of the body 1 instead of downwardly, as in Fig. 1. This tail portion 13 is braced by means of bracing flanges 14 which are joined to and merge with the dive flanges or fins 2, 2, respectively. The effect of the upturned tail 13 is to increase the rising ability of the lure as compared with that having the tail extended downwardly. With the tail turned down, the lure works above the line of troll, but with the tail turned up, it works below the line of troll. In other respects the behavior of the two types is quite similar. However, when the tail is turned up, as in Fig. 5, I prefer to give the arched dive flanges 2 somewhat more curvature than when the tail is turned down, as in Fig. 1; and the curved bottom wall 10 is somewhat less curved in Fig. 5 than in Fig. 1. It will be evident that when the tail is turned up it tends to supplement the action of the bottom wall in causing the lure to rise, and the bottom wall may therefore have less curvature, whereas, when the tail is turned down, it works with the dive flanges 2, 2 and these parts will require less curvature to produce the desired action.

Figs. 6 to 9 inclusive, show modifications of the two types of lure already described, the body portions being made solid instead of hollow. In Figs. 6 and 7 the body is of the same general contour as the body 1, already described; it may be made of wood or molded plastic material, and includes external side wall surfaces 21 and laterally extending dive flanges 22. The tail portion 23 and its bracing flanges 24 are substantially similar to those employed with the open type of body, and if plastic material is used, these parts be made integral with the body 21. The curved bottom wall 26 produces the rising reaction. An eye 25 is molded in the nose portion of the body for connection with a line, and a staple 27 is molded in the under side of the body for attachment to the hook 28. The bifurcated wire clip 29 is also embedded in the material of the body. As indicated in Fig. 7, the top surface may be transversely straight, but will be arched longitudinally, following the outlines of the lateral dive flanges 22.

In Fig. 8 the body is also solid, having external side walls 31 and longitudinally curved lateral dive flanges 32; but the tail portion 33 trends upwardly instead of downwardly, and is braced by lateral bracing flanges 34 which are joined with the dive flanges 32 and will be most conveniently made integral therewith by molding the entire body from plastic material. The bottom wall 36 is downwardly convex and of less curvature than the surface 26. An eye 35 is molded in the nose; a staple 37 is molded in the body for attachment of the hook 38; and the spring clip 39 is also embedded in the body, as indicated in the drawings.

In Figs. 10 to 15 I have shown a modified structure in which the hook is more nearly concealed and the clip which holds it in place is in a less exposed position. The body 40 is of generally streamlined outline, having upwardly curved, laterally extending dive flanges 42 for the diving function and a downwardly curved bottom wall 50 which tends to cause the rising movement as in the other forms already described. The tail 43 is shown turned down and provided with bracing flanges 44 joined to the dive flanges 42.

The outer surfaces 45 and inner surfaces 46 of the side walls provide the rotation resisting elements as similar surfaces do in other forms of the lure, the outer surfaces 45 resist rotation by presenting oppositely alike, outwardly convex surfaces on opposite sides of lure, on edge but slanting inwardly so the bottom edges form a junction with longitudinal side edges of the bottom wall, these outer surfaces are very sensitive to differences in water pressure impressed upon the opposing sides, tending to maintain the lure in an upright position, therefore returning said lure to an upright position from a position upon its side where it has been forced by a previous reaction, the inner surfaces 46 of the side walls, assist the outer surfaces 45 by confining a stream of water within the hollow body of the lure which resist being twisted spirally, which happens when said lure turns on its side around its longitudinal axis, the rising side of said lure then also wedging into the confined water stream.

The shank 47 of the hook 48 is accommodated in a downwardly open channel 51 formed in the bottom wall of the lure, and said wall is slotted at 52 to permit the eye 49 of the hook to be engaged by a cross-bar 53 of wire soldered to the inner surface of the lure. Slots 54, 54 are cut in the sides of the channel 51 so that a spring clip 55 can be placed over the channel between the side walls of the lure with the curved ends 56 of the clip extending through the slots 54 and under the shank 47, as shown in Fig. 13. Thus the hook itself is carried high up under the tail of the lure in a nearly concealed position; but when the fish bites, the shank 47 is readily released by the spring clip and the hook swings downwardly about the cross-bar or pivot 53. The clip will remain in the lure ready to engage the hook when it is reset for further use.

It may be understood that the lures made with solid body portions are slightly buoyant and that their performance is substantially similar to that of the upwardly open body type; the choice of one or the other will depend largely upon manufacturing considerations and the availability of material. It will be evident that the open body type of Figs. 1 to 5 can be made of sheet metal if desired, but that for quantity production a molded plastic structure may be found preferable. The molded body may have a downwardly open channel to accommodate the shank of the hook, and may have the spring clip or retainer molded in place, if desired, so that the hook will be carried in a position similar to that of the hook in Fig. 10 and will be readily releasable when the fish bites.

From comparative tests I have found that the open, U-shaped body is somewhat more stable in the water than the solid type. It will be evident that, whereas in the U-shaped body the tendency to whirling is resisted by four surfaces, namely, the two outer side wall surfaces 11, 11, and the two inner side wall surfaces 12, 12, the solid body has only its two outer side surfaces to perform this function.

While I have shown and described herein several alternative structures embodying my invention and illustrative thereof, it should be understood that the invention is not limited thereto or thereby, but includes all modifications, variations and equivalents of the features disclosed herein which may come within the scope of the appended claims.

I claim:

1. A fishing lure comprising a longitudinally stream-lined body simulating a fish having upwardly, longitudinally curved dive-flanges which extend from both sides and trend along the upper longitudinal outline of the body, a lower rise-reacting bottom wall, downwardly convex and longitudinally curved along the lower outline of the body, rotation resisting side walls on both sides of said body, and a rearwardly flaring tail extending obliquely from the rear end of the longitudinal axis of said body, with bracing flanges joining the flaring sides of said tail with rear portions of said dive-flanges.

2. In a fishing lure comprising a longitudinally stream-lined body simulating a fish, trending dive flanges extending from both sides and trending along the upwardly convex, longitudinally curved upper outline of said body, a lower, rise reacting bottom wall, rotation resisting side walls, a rearwardly flaring tail trending obliquely downwardly and rearwardly from the end of the longitudinal axis of said body, and bracing flanges joining the flaring sides of said tail with rear portions of said dive flanges.

3. In a fishing lure comprising a longitudinally stream-lined body simulating a fish, having dive flanges extending from both sides and trending along the upwardly convex, longitudinally curved upper outline of said body, a lower, rise reacting bottom wall, rotation resisting side walls, a rearwardly flaring tail trending obliquely upwardly and rearwardly from the end of the longitudinal axis of said body, and bracing flanges joining the flaring sides of said tail with rear portions of said dive flanges.

4. In a fishing lure comprising a longitudinally stream-lined body simulating a fish, said body being upwardly open and of U-shaped cross-section, having dive flanges extending from both sides and trending along the longitudinally curved upper outline of said body, a lower, rise reacting bottom wall, rotation resisting side walls, a rearwardly flaring tail, extending obliquely from the rear end of the longitudinal axis of said body, and bracing flanges joining the flaring sides of said tail with rear portions of said dive flanges.

JAY A. GAYLORD.

REFERENCES CITED

The following references are of record in the file of this patent:

UNITED STATES PATENTS

| Number | Name | Date |
| --- | --- | --- |
| 1,365,813 | Brown | Jan. 18, 1921 |
| 1,773,561 | Wethall | Aug. 19, 1930 |